US012579158B1

(12) United States Patent
Shah et al.

(10) Patent No.: US 12,579,158 B1
(45) Date of Patent: Mar. 17, 2026

(54) DYNAMIC ORGANIZATION OF SEARCH RESULTS

(71) Applicant: Google LLC, Mountain View, CA (US)

(72) Inventors: Syed Ali Mohammad Shah, North Brunswick, NJ (US); Jens Michael Schueppert, Miami, FL (US); Ahmed Kachkach, Horgen (CH); Gaurangi Tilak-Abhyankar, Los Altos, CA (US); Shu Tao, Chappaqua, NY (US); Jack Warren, Bellevue, WA (US); Qiu Wang, Great Neck, NY (US); George Alban Heitz, III, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/987,993

(22) Filed: Dec. 19, 2024

(51) Int. Cl.
*G06F 16/248* (2019.01)
*G06F 16/2457* (2019.01)

(52) U.S. Cl.
CPC ...... *G06F 16/248* (2019.01); *G06F 16/24578* (2019.01)

(58) Field of Classification Search
CPC .......................... G06F 16/248; G06F 16/24578
See application file for complete search history.

(56) References Cited

U.S. PATENT DOCUMENTS

| | | | | |
|---|---|---|---|---|
| 9,665,882 B2 * | 5/2017 | Yehaskel | ............... | G06F 16/951 |
| 10,984,056 B2 * | 4/2021 | Duan | .................. | G06F 16/9535 |
| 11,238,048 B1 * | 2/2022 | Breeden | ................ | G06F 16/906 |
| 11,386,164 B2 * | 7/2022 | Zhao | .................... | G06F 16/3346 |
| 11,675,816 B1 * | 6/2023 | Chandrasekharan | ........................ | G06F 11/3082 |
| | | | | 707/737 |
| 11,704,219 B1 * | 7/2023 | Lerner | .................. | G06F 11/327 |
| | | | | 714/57 |
| 11,907,315 B1 * | 2/2024 | Cui | ......................... | H04L 67/535 |
| 2012/0239519 A1 * | 9/2012 | Wu | ......................... | G06Q 30/06 |
| | | | | 705/26.61 |
| 2013/0080460 A1 * | 3/2013 | Tomko | ................... | G06F 16/951 |
| | | | | 707/E17.074 |
| 2015/0278366 A1 * | 10/2015 | Pilpel | ................... | G06F 16/9535 |
| | | | | 707/723 |
| 2018/0253498 A1 * | 9/2018 | Gray | ..................... | G06F 16/951 |
| 2019/0391982 A1 * | 12/2019 | Duzhik | ............ | G06F 16/24578 |
| 2024/0346080 A1 * | 10/2024 | Palumbo | ........... | G06F 16/90324 |
| 2025/0061141 A1 * | 2/2025 | Neervannan | ........ | G06F 16/3344 |
| 2025/0190507 A1 * | 6/2025 | Gadit | .................... | G06F 16/951 |

* cited by examiner

*Primary Examiner* — Jorge A Casanova
(74) *Attorney, Agent, or Firm* — Brake Hughes Bellermann LLP

(57) ABSTRACT

A method involves responding to a user query by inputting the query and its attributes into a generative model trained to produce multiple topic objects, each pairing a topic query with a topical search service. For each topic object within a selected subset, the method includes obtaining search results by issuing the topic query to the corresponding topical search service. Subsequently, a search result page is provided for the user query, featuring rich result listings that organize the respective search results for the topic objects in the subset. This approach enhances the relevance and depth of search results by leveraging the generative model's ability to associate user queries with specialized topical search services, thereby improving the user's search experience.

16 Claims, 9 Drawing Sheets places(title="Intimate atmosphere", query="romantic restaurants miami")
videos(title="Cozy fireplaces", query="restaurants with fireplace miami")
dishes(title="Prix fixe", query="prix fixe dishes miami")
web(title="Date night ideas", query="date night ideas miami")

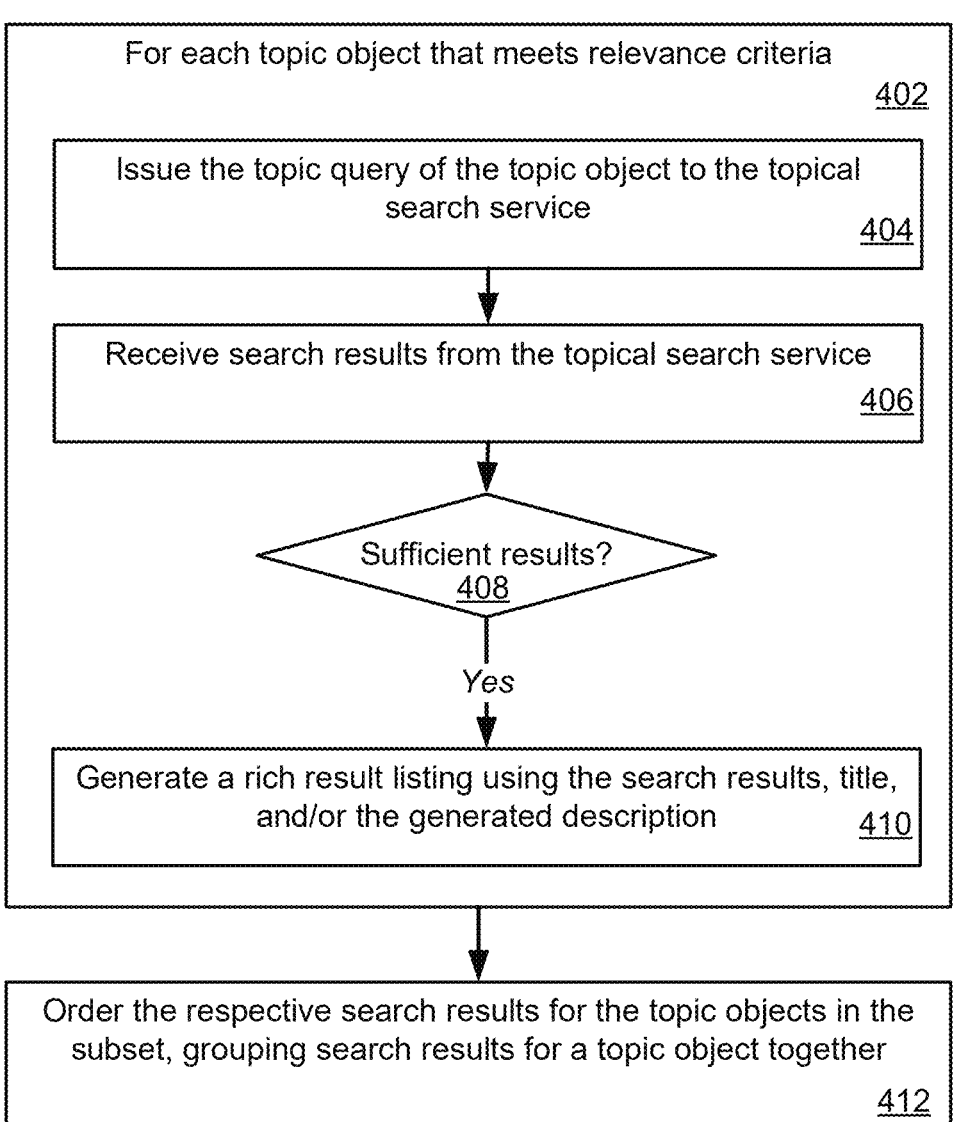

400

For each topic object that meets relevance criteria

402

Issue the topic query of the topic object to the topical search service

404

Receive search results from the topical search service

406

Sufficient results?
408

Yes

Generate a rich result listing using the search results, title, and/or the generated description

410

Order the respective search results for the topic objects in the subset, grouping search results for a topic object together

DYNAMIC ORGANIZATION OF SEARCH RESULTS

BACKGROUND

Generative models, such as large language models (LLMs), large vision models, (LVMs), etc., are machine-learning models trained to generate an output for a prompt (an input). Generative models that generate text output do so by estimating probabilities for sequences of tokens in view of the input, which can include context for the prompt. Generative models have a high number of parameters and are commonly based on a transformer architecture. Some generative models are generalized, meaning they can respond to any prompt and will generate realistic text or image responses to prompts, which can include entirely new content, referred to as creative content. Such generalized generative models can be used to generate a long-form response to a user's query as part of a search result page.

SUMMARY

Disclosed implementations relate to a search system that provides a diverse set of topical results for a particular user query. The search system uses a dynamic result model to refine the user's query for various topical search services. In particular, the dynamic result model is configured to take as input the user's query and attributes about the query. In some implementations, the dynamic result model also takes in context for the user as input. Based on the input, the dynamic result model is configured to provide a plurality of topic objects for the query. Each topic object is for a different topical search service. Each topic object has a query, e.g., a topic query, generated by the dynamic result model for the topical search service. The query is generated by the dynamic result model and refined for the topical search service based on the inputs. Thus, the queries themselves can reflect a personalization specific for the topical search service and, in some cases the user, that enables the topical search service to return more relevant, and thus higher quality, results. The topic object can include other fields generated by the dynamic result model, such as a title, a description, and/or a justification. The search system may issue the topic queries simultaneously to the respective topical search services, which return respective search results. The search system may generate a rich result listing for at least one topical search service that returned a set of respective search results. If more than one topical system returns search results, the search system may group results by topical system within the rich result listing. Put another way, the system may keep search results from a topical system together in the rich result listing. In some implementations, the search system may list search results for the topical search service in an order decided by the dynamic result model. In some implementations, the search system may list search results for the topical search service that are returned within a specified time limit and update the rich result listing with search results from the remaining topical search service that are received after the specified time limit.

The details of one or more implementations are set forth in the accompanying drawings and the description below. Other features will be apparent from the description and drawings, and from the claims.

BRIEF DESCRIPTION OF THE DRAWINGS

FIG. 4 is a diagram that illustrates an example method for obtaining respective search results for the topic objects in a subset of the plurality of topic objects, according to disclosed implementations.

DETAILED DESCRIPTION

Figure 1:
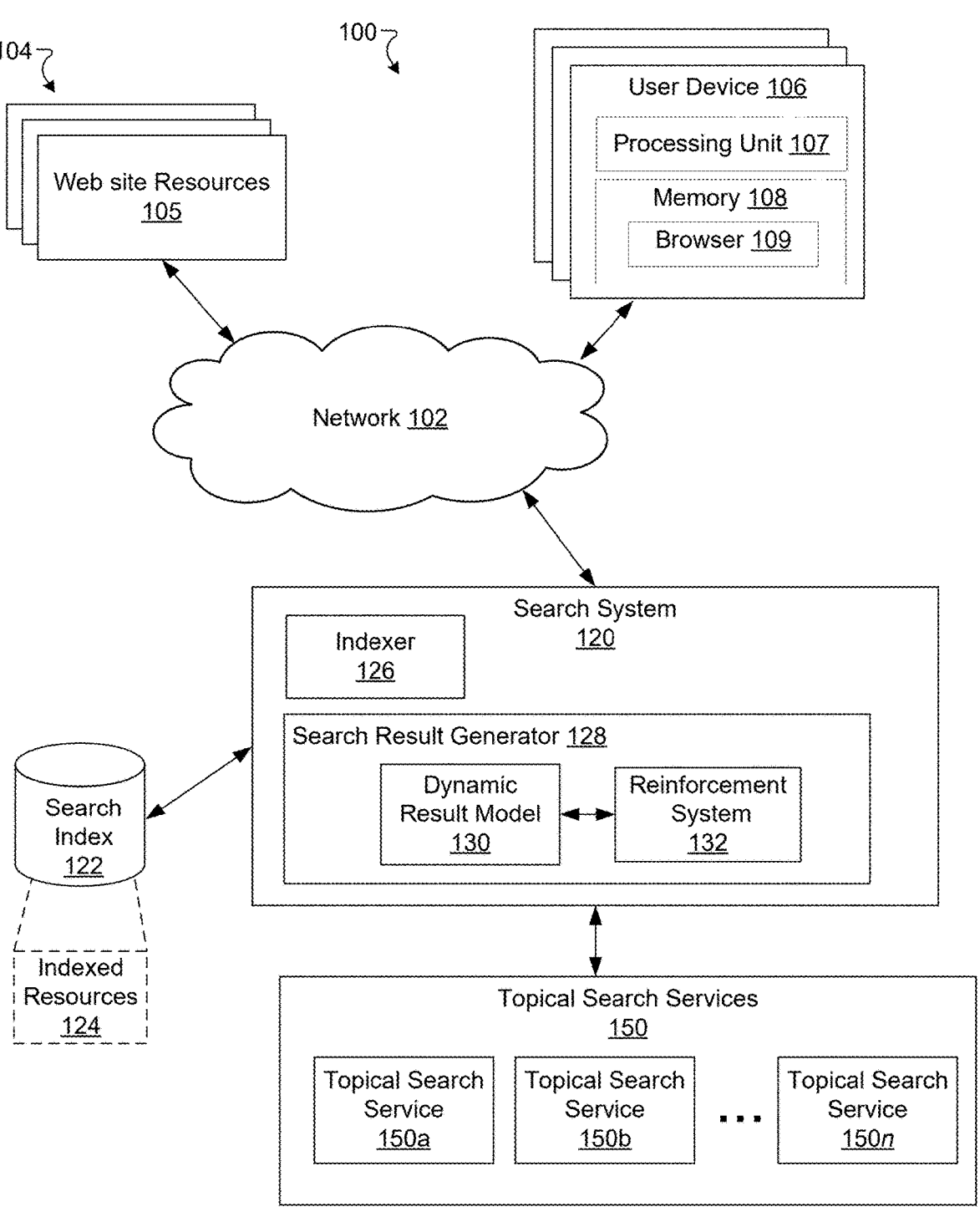
FIG. 1 is a diagram that illustrates an example system in which improved techniques described herein may be implemented.

Implementations relate to a search system that selects topical search services to provide search results for a user query, including predicting how best to use various topical search services and how to put together the results from those systems into a cohesive search result page. Search engines conventionally return documents that are responsive to a query, e.g., an Internet search engine provides web pages and other documents with a resource locator in response to a user query. As search engines have become more sophisticated, topical search services have been developed to enhance these document search results. Example topical search services include a places search service, a video search service, a restaurant search service, an internet search, a recipe search service, a forums search service, and/or an event search service, etc. These search services specialize in providing search results from a particular source, e.g., a particular type of document (e.g., videos, a forum, a social media source) and/or a particular type of entity (places, items for sale, recipes, etc.). Such search services are conventionally invoked (called from the search engine) when the user query matches a trigger (such as a query classifier or regex) for the topical search service and the same user query is provided to each topical search service. A technical problem with existing systems is that these triggers do not sufficiently capture user queries where the topical search service can provide relevant and useful search results and, because the same query is sent to each topical search service, the different topical services operate independently of each other, generating results without consideration for what the other topical search services return. This leads to duplicative results and results that are not optimized for the query setting, e.g., the location, time of day, etc., when such attributes are not part of the query itself. A technical problem with providing duplicative results from different topical search services is that such results often result in additional queries being issued to diversify the results, consuming additional computer resources and increasing the time elapsed in the user's journey. While search engines have been increasingly relying on generalist large language models to provide some diversity in search results, generalist large language models are hallucination prone and are expensive and slow. For example, generalist large language models cannot provide results in sub-second latency, which search engine users expect. Moreover, generalist large language models cover a vast landscape of topics and are expected to be accurate (factual) in the responses but also creative; the creative nature of such models cause the models to be hallucination prone.

At least one technical solution includes a dynamic result model configured to generate a diverse set of search results from topical search services in response to a user query. More specifically, the dynamic result model is a generative model based on a transformer architecture, similar to large language models, but is configured to perform the specific task of generating a plurality of topic objects given a user query and attributes about the user query. Because it performs the specific task, the dynamic result model can provide the topic objects with sub-second latency (e.g., milliseconds), which is a smaller latency than the few seconds it takes a general large language model to generate a response. A topic object represents a call to a particular topical search service. The topic object includes a query generated for the particular topical search service and may include other data items related to the generated query. The query generated for the topical search service, or topic query, is a refinement of the user query and is generated by the dynamic result model given attributes about the user query. The topic object may also include other data items generated by the dynamic result model. The dynamic result model is configured to generate a plurality of topic objects for the user query, taking into account topic queries already generated; this reduces duplicate information in the responses from the topical search services and increases the diversity of responses. The system invokes (calls) the topical search services with the respective topic queries from the topic objects. These calls can be made concurrently (in parallel), and the calls are made to the search services directly, both of which helps reduce latency. The system receives search results for each topic query from the topical search service. The search results received from the topical search services increase the diversity of responses while minimizing the risk of hallucinations. Implementations generate more coherent and complementary results, reducing the number of queries a user issues to arrive at a satisfactory answer to their query. In some implementations, search results received from a topical search service before a set period of time elapses can be initially presented in a search result page with search results obtained from the document repository with a control to show additional results returned from the other topical search services. This further reduces latency between when the user issues the query and when the search result page is presented.

A technical advantage of disclosed implementations is the described methods provide deeper query understanding and more relevant and diverse results for queries that are open-ended and/or have ambiguous intents. An open-ended query/query with ambiguous intent is a query that asks a question having multiple possible responses. An example of an open-ended query/query with ambiguous intent, such as "what to eat before a marathon." Such a query often fails to trigger the topical search services because the query does not match the template (regular expression) of a topical search service and/or fails to be classified as a query suitable for the topical search service due to intent ambiguity. A technical advantage of disclosed implementations is that the dynamic result model refines complex and/or open-ended queries (queries with ambiguous intent) to more specific and easier to fulfill queries. For example, the 'what to eat before a marathon' query can be a topic query of "healthy restaurants" for a places topical service, a topic query of "pasta carb loading recipes" for a recipe topical service, etc. The query refinement into multiple topic queries provides more relevant results for open-ended and ambiguous intents. Moreover, some implementations may use reinforcement learning to refine the dynamic response model. With user permission, the system may receive information on which search results for which topic queries were selected by users; this feedback can be used to inform the combination of topics that users prefer. Put another way, a technical advantage of disclosed implementations is that unlike current systems which are a cascade of hardcoded services hard to tune, the disclosed dynamic result model may be end-to-end optimized using the feedback data, which can significantly improve the quality and relevance of search results. The increased quality reduces use of computing resources, such as bandwidth, battery usage, and processing cycles, because the users end up issuing fewer queries to find the information desired.

FIG. 1 depicts an example environment 100 in which a search result page includes one or more rich result listings generated by topical search services selected by a dynamic result model, according to an implementation. The environment 100 includes a search result generator 128 that uses the dynamic result model 130 to facilitate the dynamic organization of search results. In particular, dynamic result model 130 is configured to select topical search services and to generate refined queries (i.e., topic queries) to send to the selected topical search services. In the example of FIG. 1, the search result generator 128 is supported by an Internet search engine but implementations are not limited to an Internet search engine and the disclosed techniques can be incorporated into other search systems.

The example environment 100 includes one or more topical search services 150, search system 120, network 102, web sites 104, and user devices 106. The search system 120 indexes web site resources 105 available from web sites 104 via the network 102. The network 102 can be a local area network (LAN or Wi-Fi network), wide area network (WAN), the Internet, or a combination thereof. The network 102 connects web sites 104, user devices 106, the search system 120. In some examples, the network 102 can be accessed over a wired and/or a wireless communications link. For example, mobile computing devices, such as smartphones can utilize a cellular network to access the network. The environment 100 may include millions of web sites 104 and user devices 106.

The search system 120 provides search services. To facilitate searching of resources 105, the search system 120 identifies the resources 105 by crawling and indexing the resources 105 provided on web sites 104. Data about the resources 105 can be indexed by indexer 126. The indexed and, optionally, cached copies of the resources 105 are stored in a search index 122, e.g., as indexed resources 124.

The search system 120 includes a search result generator 128. The search result generator 128 is configured to generate search result pages in response to user queries. The search system 120 obtains search results using the search index 122 and one or more topical search services 150, as well as from other sources. The search result page includes search results and can include other content, such as ads, entity (knowledge) panels, box answers, entity attribute lists (e.g., songs, movie titles, etc.), short answers, generated responses (e.g., from a large language model), other types of rich results, links to limit the search to a particular resource type (e.g., images, travel, shopping, news, videos, etc.), other suggested searches, etc. Each search result corresponds to a resource 105 available via a network, e.g., via a URL/URI/etc. The resources represented by search results are determined by the search result generator 128 to be top ranked resources that are responsive to the query. In other words, the search result generator 128 applies a ranking algorithm to the resources to determine an order in which to provide search results in the search result page. A search result page may include a subset of search results initially, with additional search results (e.g., for lower-ranked resources) being shown in response to a user selecting a next page of results (e.g., either by selecting a 'next page' control or by continuous scrolling, where new search results are generated after a user reaches an end of a currently displayed list but continues to scroll).

Each search result includes a link to a corresponding resource. Put another way, each search result includes a link to a host site (a web site 104) from the search result page. The link uses an identifier for the resource. Each search result may be considered to represent/be associated with a resource (a web site resource 105) corresponding to the resource identifier. The search result can include additional information, such as a title from the resource, a portion of text obtained from the content of the resource (e.g., a snippet), an image (thumbnail) associated with the resource, etc., and/or other information relevant to the resource and/or the query, as determined by the search result generator 128 of the search system 120. For example, where the query was issued from a device or application that received the user query via voice, the search result may be a snippet that can be presented via a speaker of the user device 106. The search result generator 128 may include a component configured to format the search result page for display or output on a user device 106. The search system 120 returns the search result page to the query requestor. For a query submitted by a user device 106, the search result page is returned to the user device 106 for display, e.g., within a browser, on the user device 106.

The search result page can include other user interface elements, such as a short answer, a box answer (e.g., an interactive box), entity facts, e.g., in a knowledge panel, a carousel of related entities, etc. In disclosed implementations, the search result page can include one or more rich result listings. A rich result listing is a portion of the search result page dedicated to search results from a topical search service 150a, 150b, 150n, etc. In conventional systems, the search result generator 128 may call a particular topical search service 150a, 150b . . . 150n, when the query satisfies a trigger for the topical search service. The trigger can be a regular expression against which the user query is matched. The trigger can be a keyword or series of keywords that are included in the user query. The trigger can be the classification of the user query as a query suitable for the topical search service. Put another way, the search result generator 128 may use a classifier to determine whether to send the user query to the topical search service. In conventional systems, the same user query is provided to the topical search services 150 so long as the user query satisfies the trigger.

In contrast, the search result generator 128 of disclosed implementations uses the dynamic result model 130 to not only identify which topical search services 150 to call, but also to generate a different topic query for each topical search service 150. Because different topic queries are generated, the dynamic result model 130 enables the search result generator 128 to call the same topical search service more than once, but with a different refined query (topic query). This enables the search system 120 to provide a diverse set of search result listings that more directly respond to varied intents represented by the user query and/or to subtle concepts represented in the original user query. The rich result listings thus enhance the user experience by providing a more comprehensive answer to the user's query and minimizes the necessity of issuing follow-up queries. In some implementations, the search result generator 128 may also include a reinforcement system 132. The reinforcement system 132 may be used, with user permission, to collect feedback (information) about which rich result listings users interact with (e.g., by scrolling, clicking on search results within the rich result listing, etc.). The feedback can be used for reinforcement learning of the dynamic result model 130. The use of the dynamic result model 130 and reinforcement system 132 is described in more detail with respect to FIG. 2 below.

In some implementations, the topical search services 150 may be co-located with the search system 120. In other words, in some implementations the topical search services 150 and the search system 120 may be operated at the same server, which may be a distributed server. In some implementations one or more of the topical search services 150 can be remote from, but accessible by, the search system 120. In other words, any combination of the topical search services 150 and the search system 120 can be co-located (operated by the same server, including a distributed server environment) or otherwise accessible by the search system 120. The topical search services 150 and the search system 120 may be communicatively coupled. In other words, whether co-located or not, the topical search services 150 and the search system 120 may be configured for communication with each other via one or more application programming interfaces.

The topical search services 150 may include any number (one, two, three, . . . n) of topical search services. One or more of the topical search services 150, e.g., topical search service 150a, topical search service 150b, and/or topical search service 150n, may be any existing service configured to provide search results from a particular source. Non-limiting examples of sources include places, multi-media files, forums, social media sites, shopping, a knowledge graph, restaurants, recipes, events, etc. The topical search services are thus services configured to provide a particular type of search result. The search result generator 128 and dynamic result model 130 can be configured to use any existing topical search services 150 and later-developed topical search services 150. The topical search services 150 are each accessible to the search result generator 128. In disclosed implementations, each topical search service 150a, 150b, 150n, has a respective identifier. The identifier is used in the topic objects to identify which topical search service the topic object applies to.

Environment 100 may also include user device 106. In some examples, a user device 106 is an electronic device that is under control of a user and is capable of requesting and receiving resources 105 over the network 102. Example user devices 106 include personal computers, mobile computing devices, e.g., smartphones, wearable computing devices, and/or tablet computing devices that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device, as are wearables and other smart devices such as smart TVs and smart speakers. A user device 106 typically includes a user application, e.g., a web browser, to facilitate the sending and receiving of data over the network 102.

The processing unit 107 within the user device 106 executes instructions and processes data. The processing unit 107 is responsible for running applications, including the browser 109, and handling the computational tasks required for interacting with other user devices 106, the search system 120, and/or web sites 104. Memory 108 in the user device 106 stores data and instructions for the processing unit 107. Memory 108 includes both volatile memory (e.g., RAM) and non-volatile memory (e.g., ROM, disk drives, solid-state drives). Memory 108 holds the operating system, applications, and temporary data used during the device's operation. The set of processing units and the memory together form controlling circuitry, which is configured and arranged to carry out various methods and functions as described herein.

The user devices 106 may include, among other things, a network interface, one or more processing units, memory, and a display interface. The network interface can include, for example, Ethernet adaptors, Token Ring adaptors, and the like, for converting electronic and/or optical signals received from the network to electronic form for use by the user device 106. The display interface is configured to provide data to a display device for rendering and display to a user.

The user device 106 typically includes a browser 109 for accessing web content and submitting search queries to the search system 120. In some examples, a user device 106 can include one or more input devices. Example input devices can include a keyboard, a touchscreen, a mouse, a stylus, a camera, and/or a microphone. For example, a user can use a keyboard and/or touchscreen to type in a search query. As another example, a user can speak a search query, the user speech being captured through the microphone, and processed through speech recognition to provide the search query. As another example, a user may use a camera to capture an image that is sent to the search system 120 as a query.

In response to receiving a search query, the search system 120 processes the query and accesses the search index 122 to identify resources 105 that are relevant to the search query, e.g., have at least a minimum specified relevance score for the search query. The search system 120 identifies the resources 105, generates a search result page. In disclosed implementations, the search system 120 may also use the dynamic result model 130 to add a diverse set of rich result listings from topical search services 150 in the search result page. The search system 120 returns the search result page to the query requestor. For a query submitted by a user device 106, the search result page is returned to the user device 106 for display, e.g., within a browser, on the user device 106.

Figure 2:
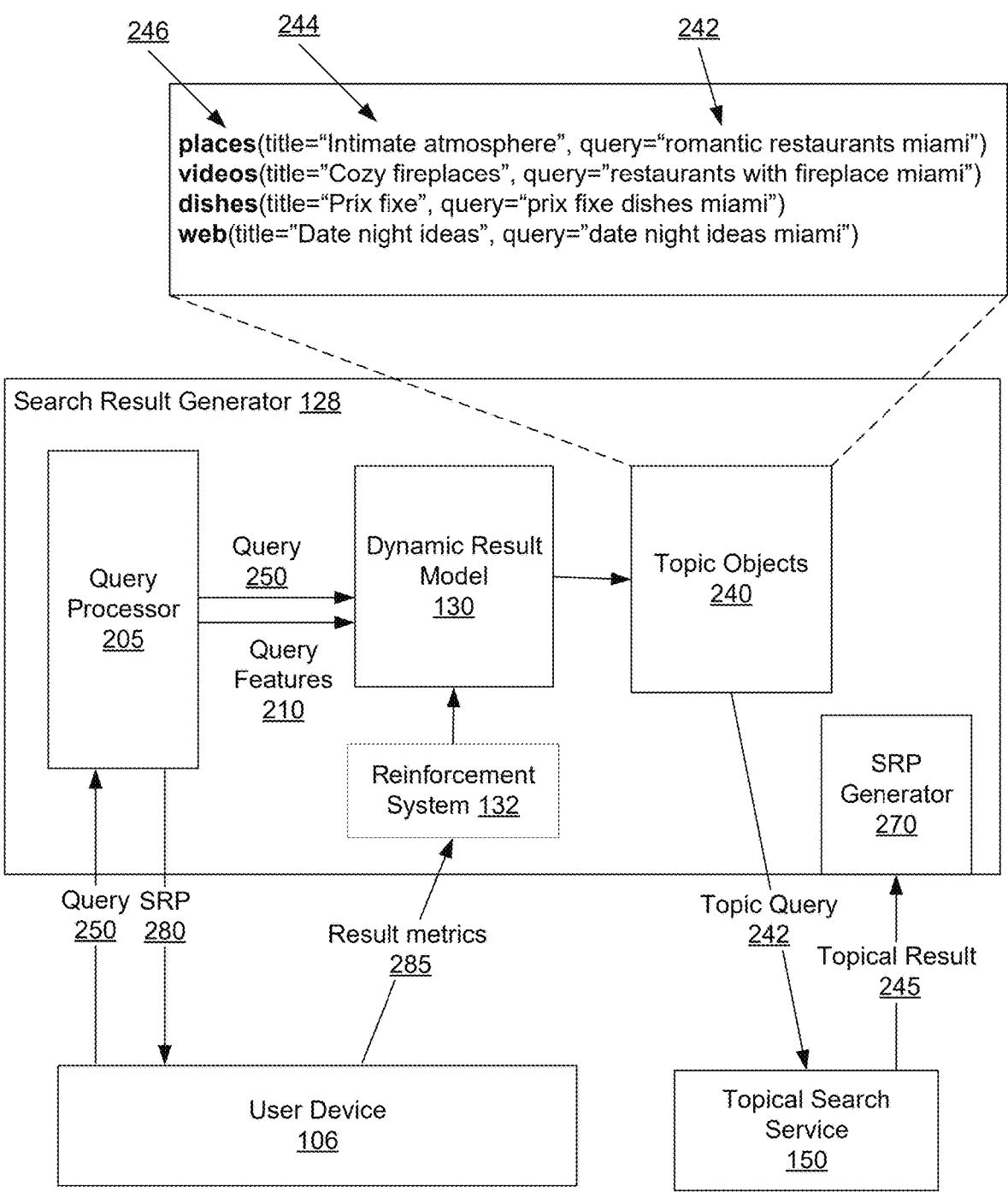
FIG. 2 is a diagram that illustrates an example search result system that uses a dynamic result model to obtain personalized category results, according to disclosed implementations.

FIG. 2 is a diagram that illustrates an example search result generator 128 that uses a dynamic result model 130, according to disclosed implementations. The dynamic result model 130 is configured to generate a cohesive but diverse set of topical search results in response to the user query. The search result generator 128 uses the dynamic result model 130 to identify relevant topical search services and to generate topic queries used to obtain search results from the topical search services. The topic queries are generated based on attributes about the query and/or, with user permission, attributes about the user. The dynamic result model 130 is configured to generate various topic queries that explore various concepts potentially represented by the user query. Because refined queries are used to obtain search results from various topical search services, the search result generator 128 compiles the search results from various topical search services into a cohesive search result page.

In the example of FIG. 2, a user using user device 106 submits a query 250 to the search system 120, which provides the query 250 to the search result generator 128. The search result generator 128 may include a query processor 205. The query processor 205 may be configured to, among other things, obtain attributes of the query 250 as query features 210. The query features 210 can include attributes such as a time of day that the query was submitted, an indication that the query date is on or near (e.g., a few days before, a week before, a month before, etc.) a holiday or event, weather information for the query date and/or a date identified in the query, and a generalized location from which the query was submitted. In some implementations, and with user permission, the query features 210 can also include the user's query history, and/or the user's preferences. The time of day when the query is submitted can significantly influence the relevance of the search results returned from a topical search service. For instance, a query for "restaurants" submitted in the morning might result in a topic query that requests breakfast options, while the same query submitted in the evening might result in a topic query requesting dinner options. Similarly, the user's location can provide context for refining the query. A query for "events" can yield different results based on whether the user is at home or traveling. For example, the dynamic result model 130 may generate a topic query requesting tourist attractions when the user is traveling but may generate a topic query for local events or events more closely aligned with the user's profile (known interests) if the user is at home.

The user's query history is another attribute that can be used to refine the query. By analyzing past queries, the dynamic result model can identify patterns and preferences, allowing the dynamic result model to generate more personalized search results. For example, if a user frequently searches for vegan recipes, the model can generate a topic query requesting vegan options in response to a query for "recipes." Additionally, user preferences, which can be derived from a user profile, can further refine the query. Preferences such as favorite cuisines, preferred activities, or interests can help the model generate more relevant and personalized topic queries. In summary, the query features, including the time of day, user location, query history, and user preferences, provide context that the dynamic result model uses to refine the query. By incorporating these attributes, the model can generate more relevant and personalized search results, enhancing the overall search experience for the user.

The dynamic result model 130 may be a generative language model based on a transformer architecture. The dynamic result model 130 is trained to generate topic objects 240 given a query 250 and query features 210. Because the dynamic result model 130 is a generative model, the dynamic result model 130 may be trained (built, configured) using a very small number of examples showcasing how different topical search services 150 work, e.g., less than 100 and in some cases less than 50. The dynamic result model 130 may also be provided with an example of the desired page composition for different types of queries, and a description of the type of input each topical search service expects. These instructions help the dynamic result model 130 generate queries that are appropriate for a particular search service. For example, a first search service may only understand (be able to process) simple queries with a few terms, while others may understand complex queries or may have requirements for query terms (no abbreviations, etc.). Such instructions provided with the examples help the dynamic result model 130 be more effective in generating topic objects 240. In some implementations, the dynamic result model 130 can be taught to prefer types of results unique to a particular location, to generate several topic objects for a particular topical search service where each topic object has a different topic query, to ensure that a first topic object directly addresses the user's query, to ensure that topic objects further down in the list of topic objects drill down into more specific things, etc.

The dynamic result model 130 generates topic objects 240, i.e., a list of topic objects, in response to a user query. Each topic object 240 represents a call to a specific topical search service (the type of the topic object) and includes a refined query, known as a topic query, tailored for that particular service. Put another way, each topic object 240 pairs a topic query with a topical search service. The dynamic result model 130 generates these topic queries by considering attributes about the user query, such as the time of day, the user's location, and, with user permission, the user's query history and preferences. This refinement process ensures that the topic queries are more specific and relevant to the user's context, thereby enhancing the quality of the search results returned by the topical search services. Moreover, because each topic query 242 is different from the other topic queries it increases the diversity of search results, increasing the completeness of the response to complex queries, or in other words queries that relate to various aspects/intents of the query.

A topic object 240 comprises several components. The primary components are the type 246 and the topic query 242. The type 246 identifies the type of topical search service to be called. Put another way, the type 246 provides the correspondence between the topic query 242 and the topical search service 150 that will provide search results for the topic query 242. The type 246 can be referred to as the topic object type. In the example of FIG. 2, the topic objects 240 include four topic objects of four different types, although implementations may generate more topic objects for a query (e.g., 10, 15, 20, etc.). The places type corresponds to a places search service, the videos type corresponds to a video search service, the dishes type corresponds to a recipe search service, and the web type corresponds to an internet search. Although not illustrated in FIG. 2, the topic objects 240 can include multiple topic objects of the same type but with different topic queries. Thus, for example, in addition to the four shown, the topic objects 240 may include a second places type of (title="conversation spots", query="restaurants good for conversations"). Each topic object 240 may also include a title 244 generated by the dynamic result model 130. This title 244 provides a concise summary of the topic and is displayed as part of the rich result listing for the topical search service on the search result page. The topic object 240 may also include a short description and/or a justification, both generated by the dynamic result model 130. The short description offers additional context or details about the topic, while the justification explains why the topic is relevant to the user's original query. As an example, a topic object of "Rooftop Restaurants" may be generated with a justification indicating that weather is predicted to be nice for the date of the dinner reservation. The justification can be presented as a subtitle or as part of the description, e.g., description 504 of FIG. 5C, snippet 608 of FIG. 6, and/or description 604 of FIG. 6.

The dynamic result model 130 generates multiple topic objects 240 for a single user query, each corresponding to a different topical search service. This approach allows the search result generator 128 to call the same topical search service more than once with different refined queries, thereby increasing the diversity of the search results. By generating a cohesive set of topic objects 240, the dynamic result model 130 ensures that the search results are comprehensive and tailored to the user's specific needs and context. In some implementations, the dynamic result model 130 generates a predetermined number of topic objects 240 for each query 250. The predetermined number can be implementation dependent (e.g., 5, 10, 15, 20, etc.). In some implementations, the search result generator 128 may filter out topic objects 240 that do not meet (fail to meet) relevance criteria. The relevance criteria may be a confidence score meeting a predetermined threshold. For example, the dynamic result model 130 may provide a confidence score for each topic object 240 and, if the confidence score for a topic object does not meet the predetermined threshold the search result generator 128 may not use the topic query for that topic object to call the respective topical search service. In some implementations, the relevance criteria may include the topic query of a topic object meeting a similarity threshold with the user query. For example, the search result generator 128 may calculate a similarity measure between the topic query and the user query (e.g., cosine similarity) to determine whether to filter out the topic object. A topic query with a similarity measure that fails to meet a similarity threshold may not be filtered out, or in other words, may not be used to call the corresponding topical search service. In some implementations, a topic object may be filtered out for policy reasons.

The search result generator 128 then issues the topic queries 242 to the respective topical search services 150. Each topical search service provides topical search results 245 for the respective topic query 242. The topical search results 245 represent resources responsive to the topic query 242. The type of resources returned depends on the search service called, e.g., the resources represent places when the places search service is called and posts from a forum when a forum search service is called, etc. The search result generator 128 issues the topic queries 242 concurrently to the respective topical search services 150, or in other words in parallel, reducing the latency time to obtain topical search results 245 from the various topical search services 150.

The topical search results 245 are returned to the search result page generator 270. The search result page generator 270 is configured to generate a search result page 280 for the query 250. The search result page 280 includes search results for documents identified using the search index 122 that are responsive to the query 250. These search results are the conventional links with a title and snippet. The search result page generator 270 is configured to rank the search results as part of the generating the search result page. The search result page generator 270 is also configured to include one or more rich result listings in the search result page 280. The search result page generator 270 is thus configured to organize the topical search results 245 from the various topical search services 150 into one or more rich result listings on the search result page 280.

The search result page generator 270 keeps the topical search results 245 returned from a call to a topical search service 150 together in a rich result listing. Put another way, the topical search results 245 returned for a single topic query 242 are grouped and presented together. However, the search result page generator 270 may be configured to determine what order to present the topical search results 245 for the various topical search services 150. In some implementations, the search result page generator 270 may keep the topical search results 245 in the order determined by the dynamic result model 130. Put another way, the order in which the dynamic result model 130 provides topic objects in the list of topic objects 240 may determine the order in which the search result page generator 270 lists the rich result listings for the topical search services 150. Even if this order is used, in some implementations, the search result page generator 270 may include other portions (e.g., a 'people also search for' portion) in between the rich result listings for topical search services 150. In some implementations, the search result page generator 270 may provide an initial group of rich result listings that are returned within a specified time limit (e.g., a predetermined period) and update the search result page 280 with additional rich result listings after the search result page 280 is initially provided to the user. Thus, even if a topic object for a first topical search service occurs ahead of a topic object for a second topical search service in the topic object 240, the search result page generator 270 may order the topical search results 245 for the second topical search service ahead of the topical search results 245 of the first topical search service in the search result page 280 because the second topical search service returned the results within the specified time limit and the first topical search service did not. In such a scenario, the search result page generator 270 can update the search result page 280 after receiving the topical search results 245 for the first topical search service.

Figure 6:
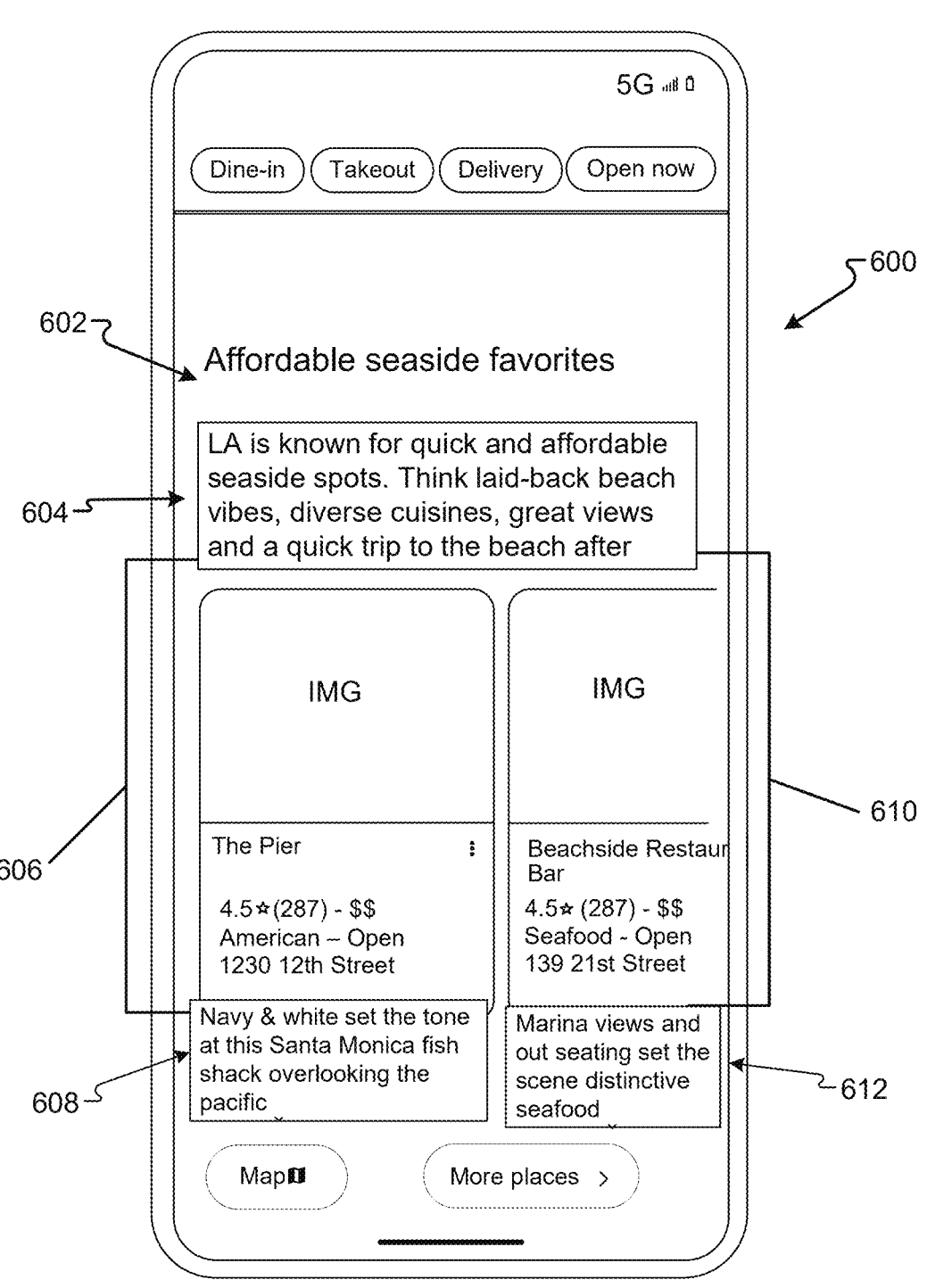
FIG. 6 illustrates an example rich result in accordance with disclosed implementations.

In some implementations, the search result page generator 270 may call additional services to add additional information to the rich result listing for a topical search service 150. For example, the search result page generator 270 may call a large language model to provide a summary of each resource or a top-ranked resource in the topical search results 245 for a particular topical search service. This additional information can be added to the search result page after the search result page is first sent to the user. Put another way, the search result page can update the rich result listing for a topical search service with the generated summary after that summary has been received. Such additional information is illustrated in FIG. 6.

The search system 120 provides the search result page 280 for the query 250 to the user device 106. In some implementations, the search result generator 128 may store or cache the topical search results 245 generated for the query 250 using the topic object 240. For example, if a particular query 250 is a popular query (e.g., issued a minimum number of times over a set period by different users), the search result generator 128 may save the rich result listings generated for the topic objects 240 generated for the query. This way the rich result listings can be more quickly provided in response to future queries that are semantically similar to the query.

In some implementations, the user device 106 may provide result metrics 285 to the search result generator 128. The result metrics 285 represent feedback for the search result page 280. The reinforcement system uses these result metrics 285 to inform the dynamic result model about user preferences and behaviors. The reinforcement system 132 uses these result metrics 285 to inform the dynamic result model 130 about these user preferences and behaviors. By analyzing the collected feedback, the system identifies patterns and trends in user interactions, which are then used to adjust and improve the dynamic result model 130.

The reinforcement system 132 employs reinforcement learning techniques to refine the dynamic result model 130. The collected feedback, in the form of result metrics 285, serves as a reward signal, guiding the dynamic result model 130 to generate topic objects 240 for future queries that are more likely to be interacted with. This supports a better user experience as the results are more likely to answer the user's intended query. For instance, if users consistently click on search results related to a particular topic object, the dynamic result model 130 learns to prioritize similar topical queries for similar user queries. Conversely, if topical search results 245 for certain topic objects 240 receive fewer clicks, the dynamic result model 130 adjusts to reduce the prominence of those topic objects or to reduce the confidence in those topic objects. The reinforcement system 132 may operate continuously, updating the dynamic result model 130 with new result metrics 285 as users interact with the search result pages generated using the topic objects 240. This ongoing refinement process enhances the model's ability to generate topic objects 240 that align with user preferences and query contextual factors, such as time of day and location. This iterative process of collecting feedback and refining the dynamic result model 130 enables the dynamic result model 130 to control what the rich result listings on the search result page look like. In contrast, current systems provide a cascade of many hardcoded systems that are harder to tune. The reinforcement system 132 thus enables the end-to-end optimization of the dynamic result model 130, ensuring that the dynamic result model 130 evolves to better meet user needs, providing more accurate and diverse search results over time.

Further to the descriptions above, a user may be provided with controls allowing the user to make an election as to both if and when systems, programs, or features described herein may enable collection of user information (e.g., information about interactions with search results on the search result page, including which rich result listings the user has interactions with, information about a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 3:
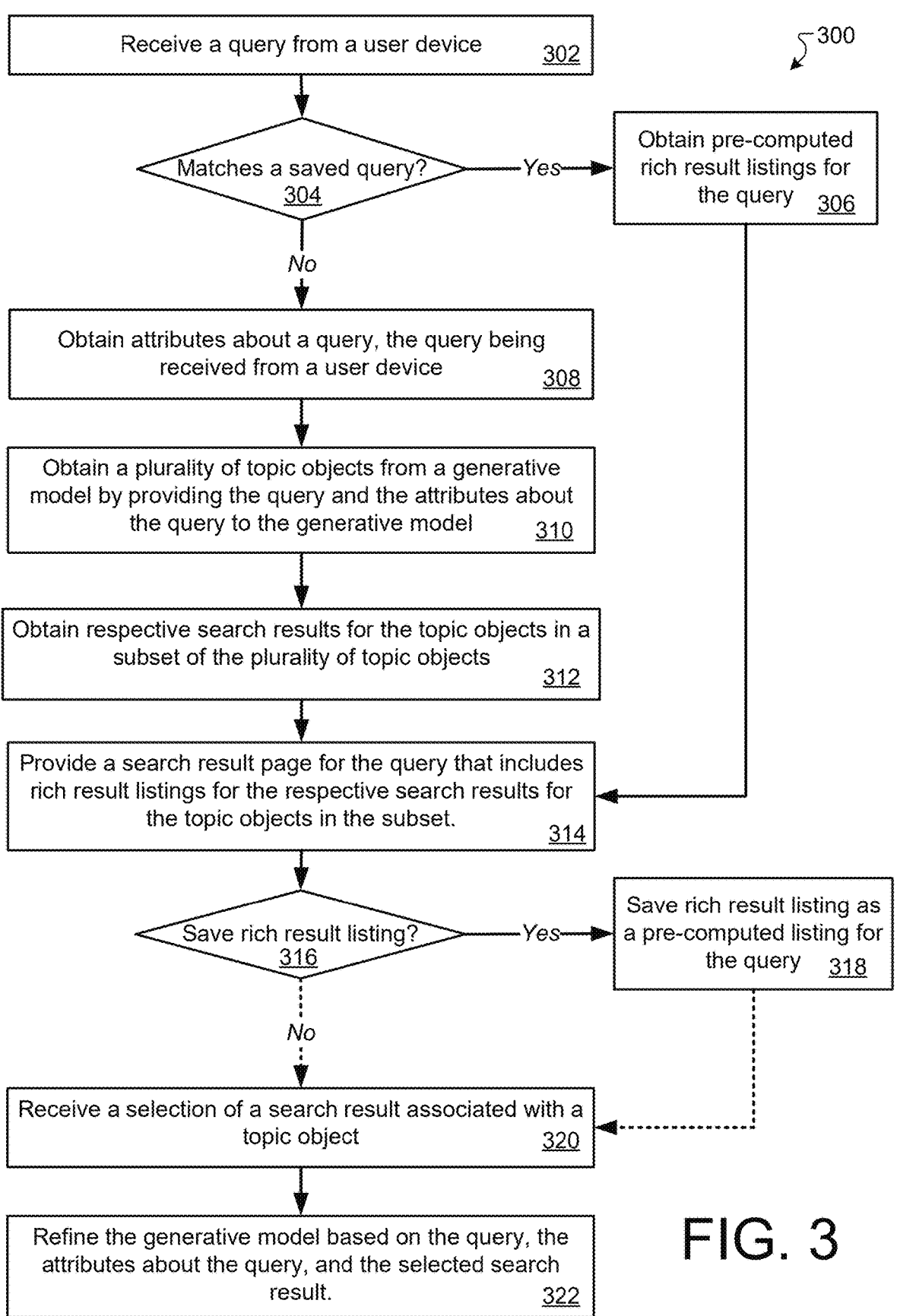
FIG. 3 is a diagram that illustrates an example method for using a dynamic result model to obtain category results, according to disclosed implementations.

FIG. 3 is a diagram that illustrates an example method for using a dynamic result model to obtain category results, according to disclosed implementations. Method 300 may be executed in an environment, such as environment 100 of FIG. 1. The method begins with step 302, which includes receiving a query from a user device. In some implementations, as part of step 302, the system determines whether or not to use the dynamic result model for the query. Some queries seek a particular piece of information, e.g., a fact or an answer that can be covered in one sentence. The dynamic result model may not be used for such queries because the query does not have multiple aspects or an ambiguous intent. When the user query is such a factual query, the system may not perform method 300. In some implementations, the system may use a service to determine whether or not to continue with method 300. The service may be or may use a classifier configured to classify the query as a factual query or not. A query that covers multiple aspects, has nuances in the intent, and/or an ambiguous intent would not be classified as a factual query. Some implementations may not use the dynamic result model for factual queries. In some implementations, the classifier may be configured to determine whether the query is appropriate for the dynamic result model or not.

In implementations where the system saves rich result listings generated for topic objects, at step 304 the system determines whether the query matches a saved query. If the query matches a saved query, at step 306 the system obtains pre-computed rich result listings for the query. The pre-computed rich result listings represent rich result listings generated from a list of topic objects generated for a previous query that is similar to the query. The similarity can be a semantic similarity calculated between the user's query and the prior query (i.e., the saved query). The pre-computed rich result listings enable the system to skip steps 308 to 312 and just include the pre-computed rich result listings in the search result page at step 314. If the query does not match a saved query, at step 308 the system proceeds to obtain attributes about the query, the query being received from a user device. The attributes can include any of the query attributes discussed with respect to FIGS. 1 and 2 above.

At step 310, the system then obtains a plurality of topic objects from a generative model, such as the dynamic result model 130, by providing the query and the attributes about the query to the generative model. The plurality of topic objects can be referred to as a list of topic objects. At step 312, for each topic object in a subset of the plurality (list) of topic objects, the system obtains respective search results by issuing the topic query to the topical search service represented by the type of the topic object. The topical search service provides the search results for the topic query. At step 314 the system then provides a search result page for the query that includes one or more rich result listings for the respective search results for the topic objects in the subset.

At step 316 the system determines whether to save the rich result listing(s) as pre-computed rich result listings for the query. The decision on whether to save the rich result listings can be based on popularity of the query. The popularity may be determined as a minimum number of occurrences of the query over a specified time frame. This minimum number of occurrences over a specified time frame may be referred to as a popularity threshold. If the system decides to save the rich result listings (e.g., the user query meets the popularity threshold) and the query has not already been saved, at step 318 the system saves the rich result listings as pre-computed listings for the query.

In some implementations, at step 320, the system then receives a selection of a search result associated with a topic object. The user device may, with user permission, obtain information about the selected search result, information about the query, and information about other rich result listings included in the search result page and provide that information to the system. At step 322 the system refines the generative model based on the information provided, such as information about the query, the attributes about the query, and the selected search result. The refinement using the information about the selected search result may be done by a reinforcement system, such as reinforcement system 132 of FIGS. 1 and 2.

FIG. 4 is a diagram that illustrates an example method 400 for obtaining respective search results for the topic objects in a subset of the plurality of topic objects, according to disclosed implementations. This figure provides a detailed explanation of step 312 of FIG. 3. The method 400 begins with step 402, which identifies each topic object in the list (plurality) of topic objects that meets a relevance criteria. This step involves evaluating the topic objects generated by the dynamic result model to determine their relevance to the user query and the associated attributes. The relevance criteria used to evaluate topic objects for relevance involve multiple factors to ensure alignment with the user's query and context. These factors include the user's preferences, query context, and specific query attributes. In some examples, each topic object is assigned a confidence score by the dynamic result model, which must meet a predetermined threshold to be considered relevant. In some examples, a similarity measure, such as cosine similarity, is calculated between the topic query and the user query to ensure close alignment with the user's intent. The system may also consider the diversity of queries, ensuring that no two topic queries of the same type (type of topic object) are too similar. By evaluating confidence scores, similarity measures, and diversity, the system ensures that the generated topic objects are highly relevant and provide a comprehensive set of search results. Steps 404 to 410 are performed for each topic object that meets the relevance criteria. In some implementations, all topic objects in the list of topic objects are considered to meet the relevance criteria. Put another way, step 402 may be optional and steps 404 to 410 are performed for all topic objects in the list of topic objects for the user query. The topic objects that meet the relevance criteria are considered a subset of the plurality of topic objects.

For a topic object that meets the relevance criteria (i.e., for each topic object in the subset), at step 404, the system issues the topic query of the topic object to the topical search service represented by the type of topic object. This involves sending the refined query, generated by the dynamic result model, to the appropriate topical search service, i.e., the topical search service represented by the type of topic object. The topical search service is specialized in retrieving results for a specific type of content, such as places, videos, restaurants, recipes, forums, or events.

At step 406, the system then receives search results from the topical search service. At step 408, the system may evaluate whether the search results are sufficient. This evaluation may involve checking whether the number of search results meets a predefined threshold and/or whether the results are relevant enough. If the search results in the rich result listing are not sufficient, the system may not use the rich result listing in the search result page.

If the search results are deemed sufficient, at step 410, the system generates a rich result listing using the search results. The rich result listing includes the search results returned by the topical search service in response to the topic query. Each rich result listing may include the title from the topic object, and/or a generated description. The title and description are generated by the dynamic result model and are included in the topic object. The title provides a concise summary of the topic, while the description offers additional context or justification for the search results. In some implementations, the system may add a respective generated summary for each search result in the rich result listing. These summaries can be generated using a call to a summary service, which uses a large language model. Because the response time for such models does not meet the sub-second latency expected for a search result page, the summaries may be provided as updates to the initial search result page.

At step 412, the system orders the respective search results for the topic objects in the subset (i.e., the topic objects that meet the relevance criteria). The system groups search results for a topic object together in a single rich result listing. The system further organizes the rich result listings in the search result page. This may include ordering the rich result listings in an order in which the topic objects appear in the list of topic objects generated by the dynamic result model. This may include providing the rich result listings for topical search services that provide a response (the search results) within a specified time limit, or in other words a predetermined time limit. Additional rich result listings can be provided as an update to the search result page at a later time. The ordering may include interleaving the rich result listings for the topic objects with other types of search results or other types of rich results.

Figure 5A:
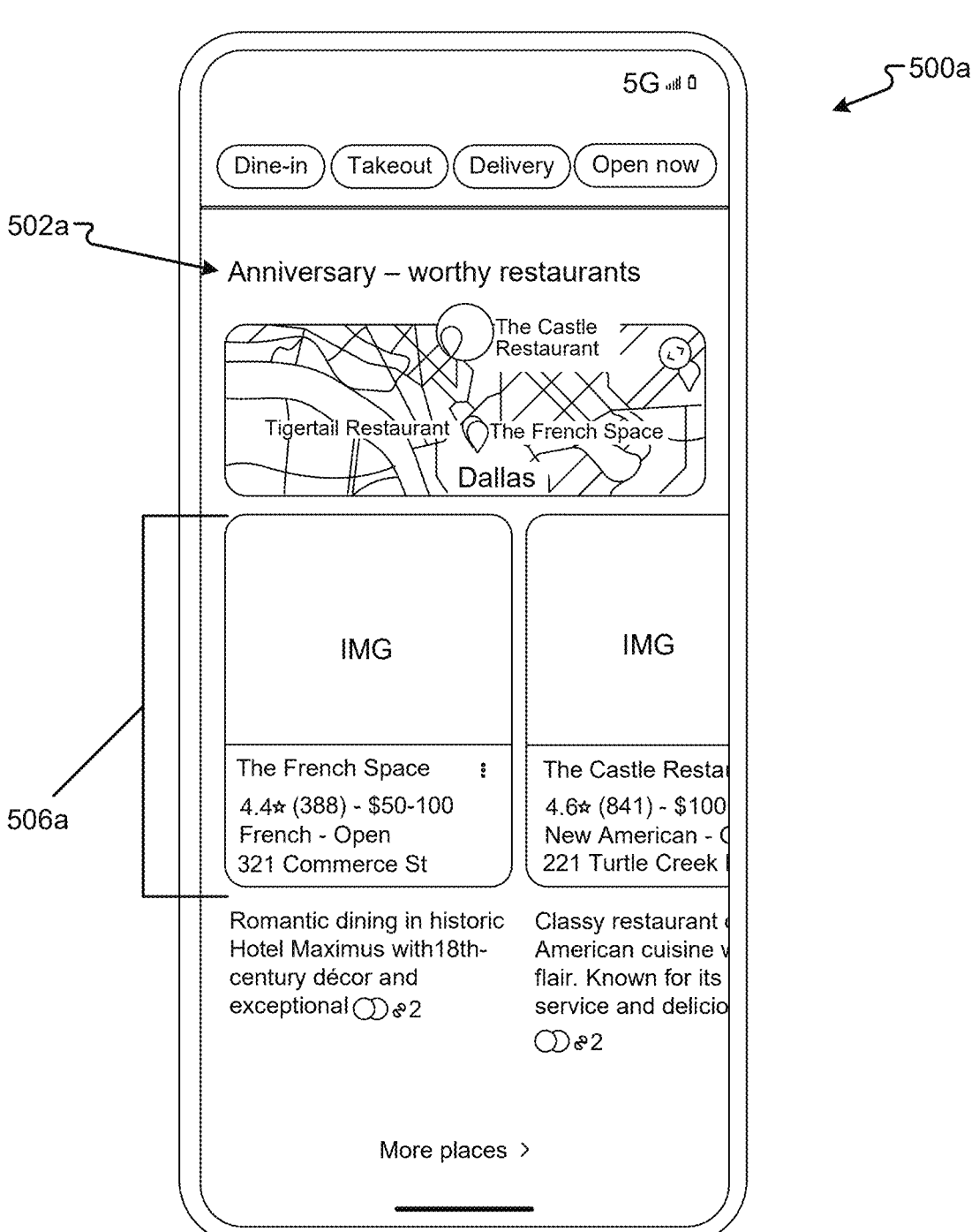
FIGS. 5A to 5C illustrate rich result listings generated from topic objects, according to an implementation.
Figure 5B:
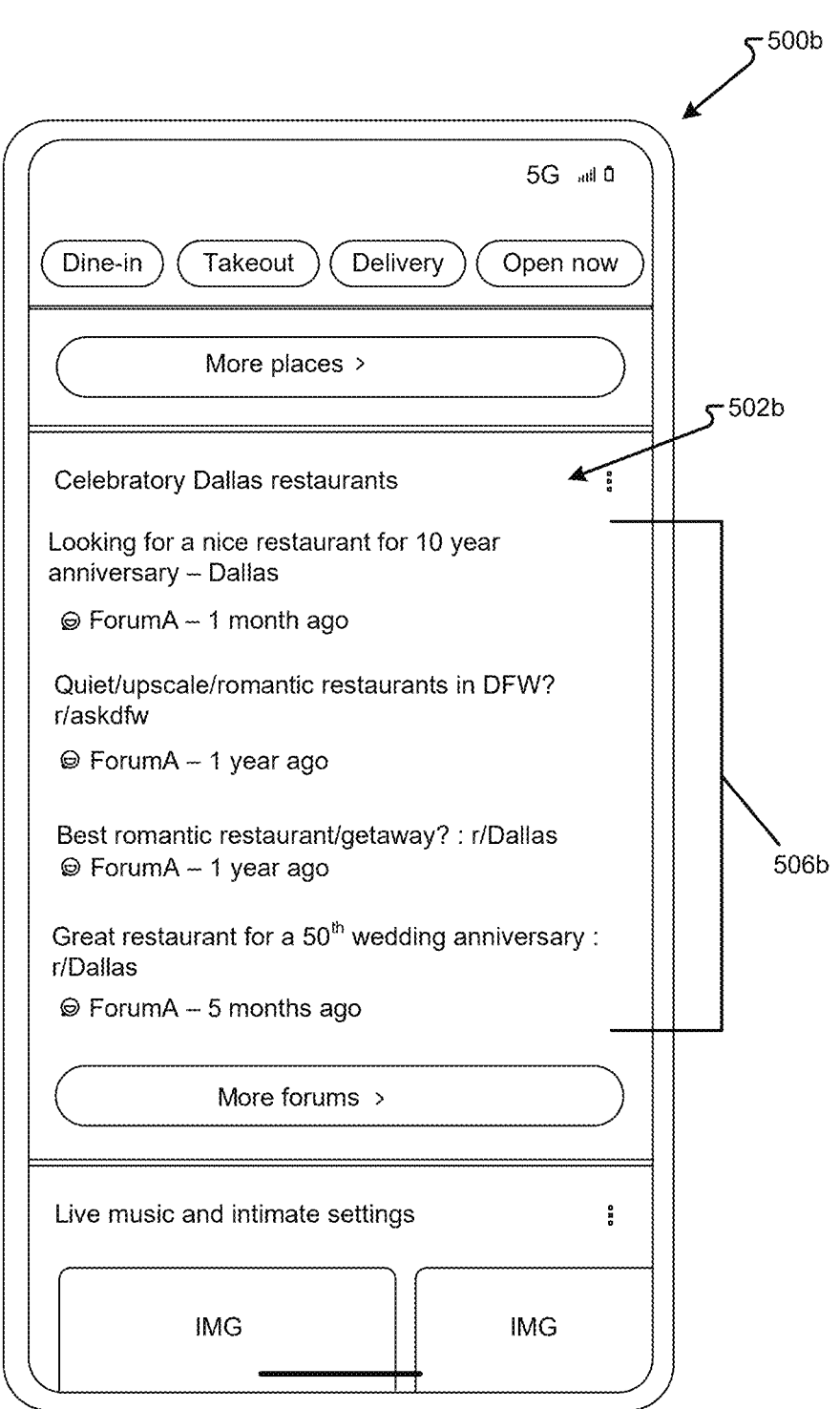
Figure 5C:
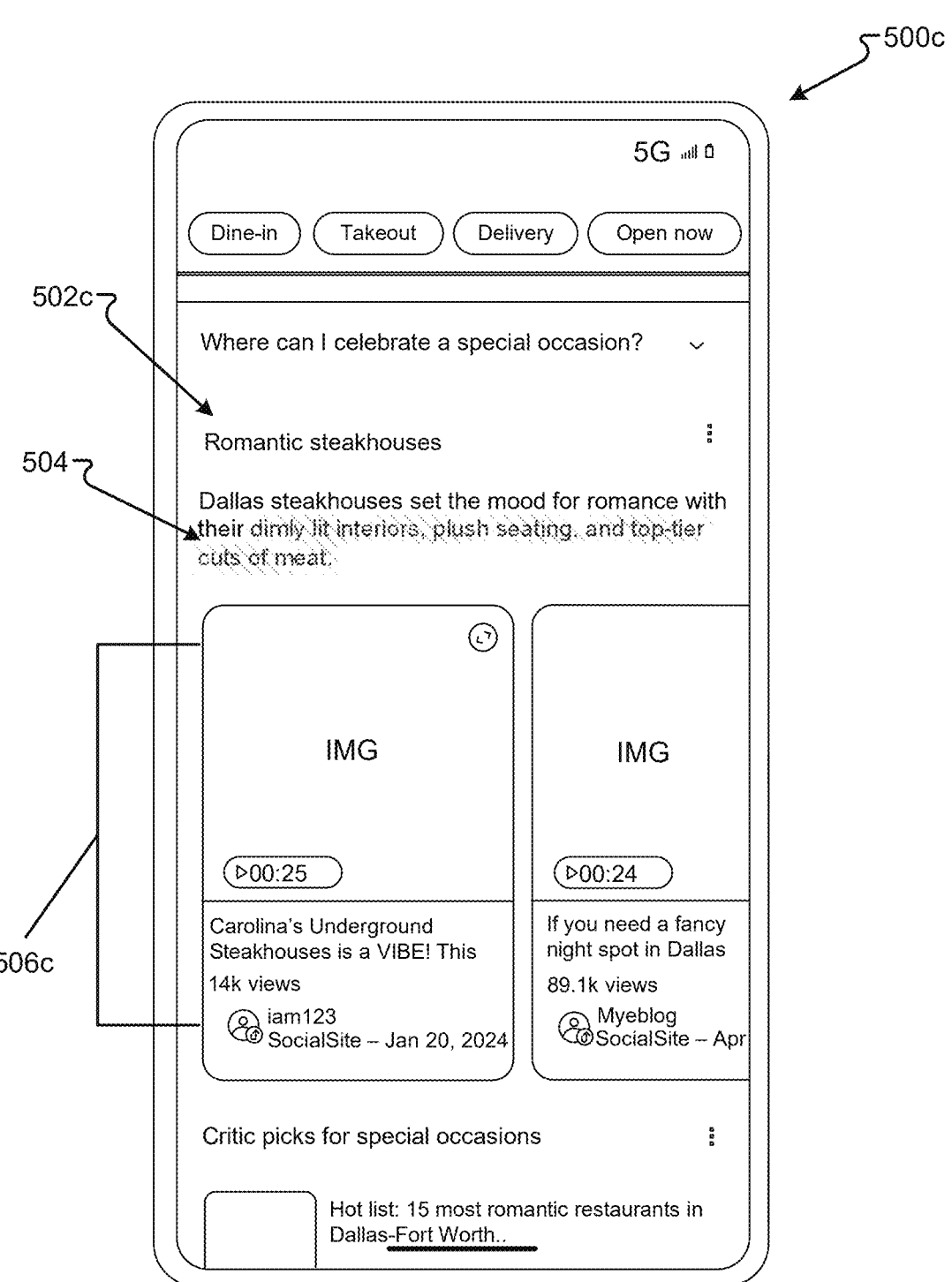

FIGS. 5A to 5C illustrate example rich result listings generated from topic objects generated for a user query, in accordance with disclosed implementations. In the example of FIGS. 5A to 5C, the search result page and rich result listings are formulated for a user device with limited display area. However, implementations are not so limited and the rich result listings may be configured differently in a display with more display area. In the example of FIGS. 5A to 5C, a user has entered a query of "anniversary celebration dinner in Dallas". In addition to identifying resources responsive to this query for the search index, in this example at least three topic objects have been included in the subset of topic objects generated for the query. The search results from the topical search services are provided in three rich result listings 500a, 500b, and 500c. In FIG. 5A, a first rich result listing 500a is illustrated for a places search service. The first rich result listing 500a includes a title 502a and the search results 506a. In FIG. 5B, a second rich result listing 500b is illustrated for a forums search service. The second rich result listing 500b includes a title 502b and search results 506b.

In FIG. 5C, a third rich result listing 500c is illustrated for the places search service, but with search results for a different topic query than the topic query used to generate the first rich result listing 500a. Thus, the title 502c for the third rich result listing 500c differs from the title 502a for the first rich result listing 500a. The topic query corresponding to the third rich result listing 500c may reflect the user's interests and preferences, and include search results 506c. Thus, FIGS. 5A and 5C illustrate how implementations provide a search result page that includes a more comprehensive set of search results for a query with the results focusing on different aspects of the query. The third rich result listing 500c also includes a description 504 generated for the topic object. In some implementations, a portion of the description may be given a different appearance (e.g., highlighted, italicized, etc.). The portion with a different appearance may be identified because it is determined to be relevant to the topic query. The portion with a different appearance may be identified because it represents a justification.

FIG. 6, which illustrates an example rich result listing 600 generated using a dynamic result model. The rich result listing 600 includes various components that can be included in a rich result listing for a topic object. In the example of FIG. 6, the rich result listing 600 includes a title 602 generated for the topic object. The title is generated by the dynamic result model and provides a concise summary of the topic related to the user query. The rich result listing 600 includes a description 604 for the rich result listing that is generated by the dynamic result model and/or by another large language model. The description provides additional context or justification for the search results included in the rich result listing. The example rich result listing 600 of FIG. 6 includes a first search result 606 and a second search result 610. The search results represent resources identified by the topical search service as responsive to the topic query. In the example of FIG. 6, the search results are horizontally scrollable, so additional search results may be viewable via scrolling. Each search result includes a title, a rating, a category, and an address, and can include any information returned by the topical search service. The type of information in a search result may depend on the type of search service. Thus, for example, place resources may have different information than shopping resources or forum resources. The topical search services determine what information is included in a search result, such as first search result 606 and second search result 610. The first search result 606 and the second search result 610 are examples of resources obtained from a topical search service specialized in retrieving results for places.

In the example of FIG. 6, a snippet 608 may be generated for the first search result 606. The snippet 608 provides a brief description of the place, offering more information to the user about the search result. The snippet 608 can be generated by a large language model. In some implementations, the snippet 608 can be added to an initial rendering of the search result page that includes the rich result listing 600 (e.g., due to latency in generating the snippet 608). The second search result 610 may also have a respective snippet 612. The snippet 612 provides a brief description of the resource represented by the second search result 610, offering more information to the user about the search result.

Figure 7:
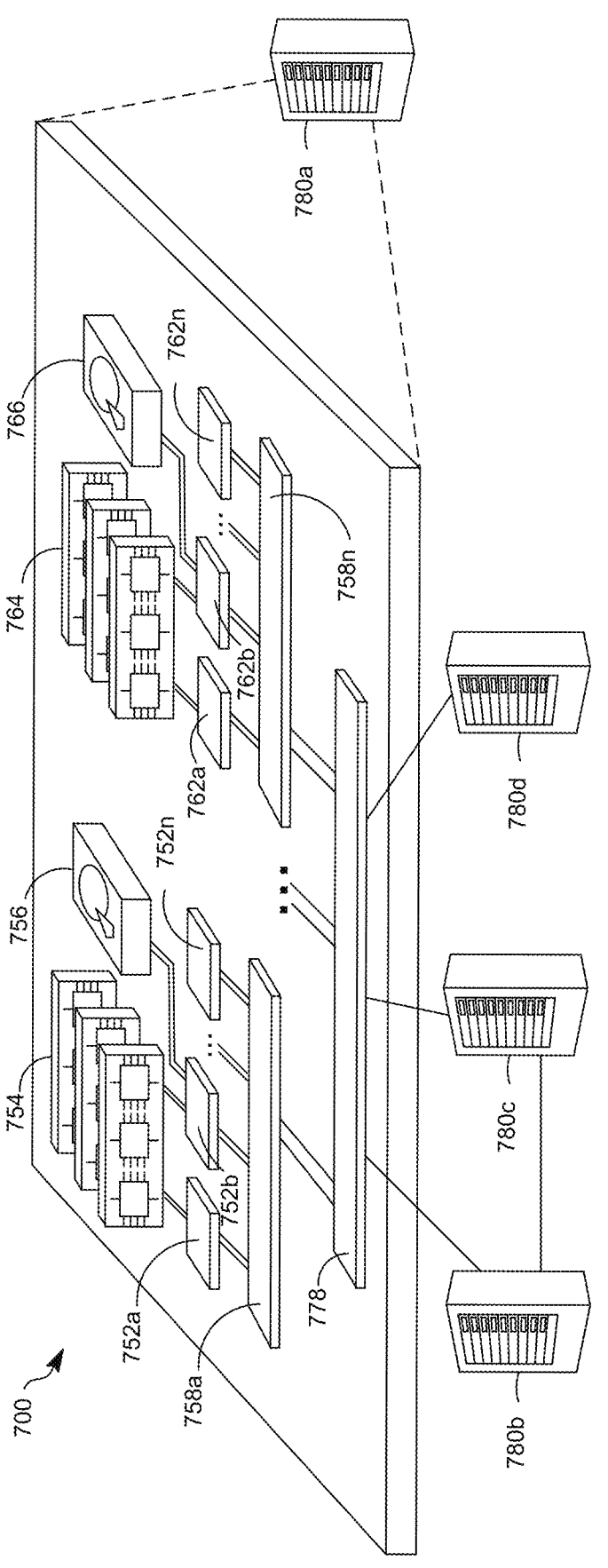
FIG. 7 is a diagram that illustrates an example of a distributed computer device that can be used to implement the described techniques.

FIG. 7 shows an example of a computing device 700, which may be search system 120 of FIG. 1, which may be used with the techniques described here. Computing device 700 is intended to represent various example forms of large-scale data processing devices, such as servers, blade servers, data centers, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Computing device 700 may be a distributed system that includes any number of computing devices 780a, 780b, . . . 780n. Computing devices 780a, 780b, . . . 780n may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a, 752b, . . . 752n and 762a, 762b, . . . 762n. The processors may include data processors, network attached storage devices, and other computer-controlled devices. In some implementations, one processor may operate as a master processor and control the scheduling and data distribution tasks. Processors may be interconnected through one or more rack switches 762a-762n, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a non-transitory computer-readable medium storing instructions executable by one or more of the processors. Memory 754 and 764 may include, e.g., volatile memory unit or units, a non-volatile memory unit or units, and/or other forms of non-transitory computer-readable media, such as a magnetic or optical disks, flash memory, cache, Random Access Memory (RAM), Read Only Memory (ROM), and combinations thereof. Memory, such as memory 754 may also be shared between processors 752*a*-752*n*. Data structures, such as an index, may be stored, for example, across storage 756 and memory 754. Computing device 700 may include other components not shown, such as controllers, buses, input/output devices, communications modules, etc.

An entire system may be made up of multiple computing devices 700 communicating with each other. For example, device 780*a* may communicate with devices 780*b*, 780*c*, and 780*d*, and these may collectively be known as dynamic result model 130, topical search services 150, and/or search system 120. Some of the computing devices may be located geographically close to each other, and others may be located geographically distant. The layout of computing device 700 is an example only and the system may take on other layouts or configurations.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite example relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Clause 1. A method comprising: in response to a user query, providing the user query and attributes about the user query as input to a generative model, the generative model being trained to generate and provide a plurality of topic objects in response to the input, a topic object pairing a topic query with a topical search service, for each topic object in a subset of the plurality of topic objects, obtaining respective search results for the topic object by issuing the topic query to the topical search service; and providing a search result page for the user query that includes rich result listings for the respective search results of the topic objects in the subset.

Clause 2. The method as in clause 1, wherein the topic object further includes a title generated for the topic query, wherein the titles are displayed as part of the rich result listings for the topic objects in the subset.

Clause 3. The method as in clause 2, wherein at least one topic object further includes a short description related to the topic query, the short description being displayed as part of the rich result listing for at least one topic object.

Clause 4. The method as in clause 2, wherein at least one topic object further includes a justification related to the topic query, the justification being displayed as part of the rich result listing for the at least one topic query.

Clause 5. The method as in any of clause 1 to clause 4, wherein the query attributes further include interests from a profile associated with a user providing the user query.

Clause 6. The method as in any of clause 1 to clause 5, further comprising, for the topic objects in the subset, concurrently issuing the topic queries to the paired topical search services.

Clause 7. The method as in clause 6, further comprising: ordering, in the search result page, the respective search results in an order corresponding to the order the topic objects were provided by the generative model.

Clause 8. The method as in clause 6, wherein generating the search result page includes: determining that a specified time limit has elapsed from issuing the topic queries; providing, in the search result page, rich result listings for the respective search results that have been received from the topical search services; and providing an update to the search result page, the update including rich result listings for the respective search results from at least one topical search service that were not received during the specified time limit.

Clause 9. The method of any of clause 1 to clause 8, further comprising: receiving a selection of a search result associated with a particular topic object; and refining the generative model by using the search result, the user query, and attributes about the user query in reinforcement learning.

Clause 10. The method of any of clause 1 to clause 9, further comprising: determining that the user query meets a popularity threshold; and saving the rich result listings as a pre-computed listing for the user query.

Clause 11. The method of clause 10, wherein the user query is a first user query and the method further comprises: receiving a second user query; determining that the second user query matches the first user query; and providing a second search result page for the second user query that includes the pre-computed listing.

Clause 12. A system comprising: at least one processor; and memory storing instructions that, when executed by the at least one processor, cause the system to perform the method of any of clause 1 to clause 11.

Clause 13: A non-transitory computer-readable medium storing instructions that, when executed by at least one processor, cause a computing system to perform the method of any of clause 1 to clause 11.

What is claimed is:

1. A method comprising:

in response to a user query, providing the user query and attributes about the user query as input to a generative model, the generative model being trained to generate and provide a plurality of topic objects in response to the input, a topic object pairing a topic query with a topical search service, for each topic object in a subset of the plurality of topic objects, concurrently issuing topic queries to the paired topical search services to obtain respective search results for the topic object; and providing a search result page for the user query that includes rich result listings for the respective search results of the topic objects in the subset, wherein providing the search result page includes:

determining that a specified time limit has elapsed from issuing the topic queries;

providing, in the search result page, rich result listings for the respective search results that have been received from the topical search services; and providing an update to the search result page, the update including rich result listings for the respective search results from at least one topical search service that were not received during the specified time limit.

2. The method as in claim 1, wherein the topic object further includes a title generated for the topic query, wherein the titles are displayed as part of the rich result listings for the topic objects in the subset.

3. The method as in claim 2, wherein at least one topic object further includes a short description related to the topic query, the short description being displayed as part of the rich result listing for at least one topic object.

4. The method as in claim 2, wherein at least one topic object further includes a justification related to the topic query, the justification being displayed as part of the rich result listing for the at least one topic query.

5. The method as in claim 1, wherein the query attributes further include interests from a profile associated with a user providing the user query.

6. The method as in claim 1, further comprising:

ordering, in the search result page, the respective search results in an order corresponding to the order the topic objects were provided by the generative model.

7. The method of claim 1, further comprising:

receiving a selection of a search result associated with a particular topic object; and refining the generative model by using the search result, the user query, and attributes about the user query in reinforcement learning.

8. The method of claim 1, further comprising:

determining that the user query meets a popularity threshold; and saving the rich result listings as a pre-computed listing for the user query.

9. The method of claim 8, wherein the user query is a first user query and the method further comprises:

receiving a second user query;

determining that the second user query matches the first user query; and providing a second search result page for the second user query that includes the pre-computed listing.

10. A system comprising:

at least one processor; and memory storing instructions that, when executed by the at least one processor, cause the system to perform operations including:

in response to a user query, providing the user query and attributes about the user query as input to a generative model, the generative model being trained to generate and provide a plurality of topic objects in response to the input, a topic object pairing a topic query with a topical search service, for each topic object in a subset of the plurality of topic objects, concurrently issuing topic queries to the paired topical search services to obtain respective search results for the topic object; and providing a search result page for the user query that includes rich result listings for the respective search results of the topic objects in the subset, wherein providing the search result page includes:

determining that a specified time limit has elapsed from issuing the topic queries;

providing, in the search result page, rich result listings for the respective search results that have been received from the topical search services; and providing an update to the search result page, the update including rich result listings for the respective search results from at least one topical search service that were not received during the specified time limit.

11. The system as in claim 10, wherein the topic object further includes a title generated for the topic query, wherein the titles are displayed as part of the rich result listings for the topic objects in the subset.

12. The system as in claim 11, wherein at least one topic object further includes a short description related to the topic query, the short description being displayed as part of the rich result listing for at least one topic object.

13. The system as in claim 10, wherein the query attributes further include interests from a profile associated with a user providing the user query.

14. The system as in claim 10, the operations further including:

ordering, in the search result page, the respective search results in an order corresponding to the order the topic objects were provided by the generative model.

15. The system of claim 10, the operations further including:

receiving a selection of a search result associated with a particular topic object; and refining the generative model by using the search result, the user query, and attributes about the user query in reinforcement learning.

16. The system of claim 10, wherein the user query is a first user query and the operations further include:

determining that the first user query meets a popularity threshold;

saving the rich result listings as a pre-computed listing for the user query;

receiving a second user query;

determining that the second user query matches the first user query; and providing a second search result page for the second user query that includes the pre-computed listing.

* * * * *